April 9, 1935.  C. E. JOHNSON  1,996,998
PISTON RING
Filed Nov. 10, 1930
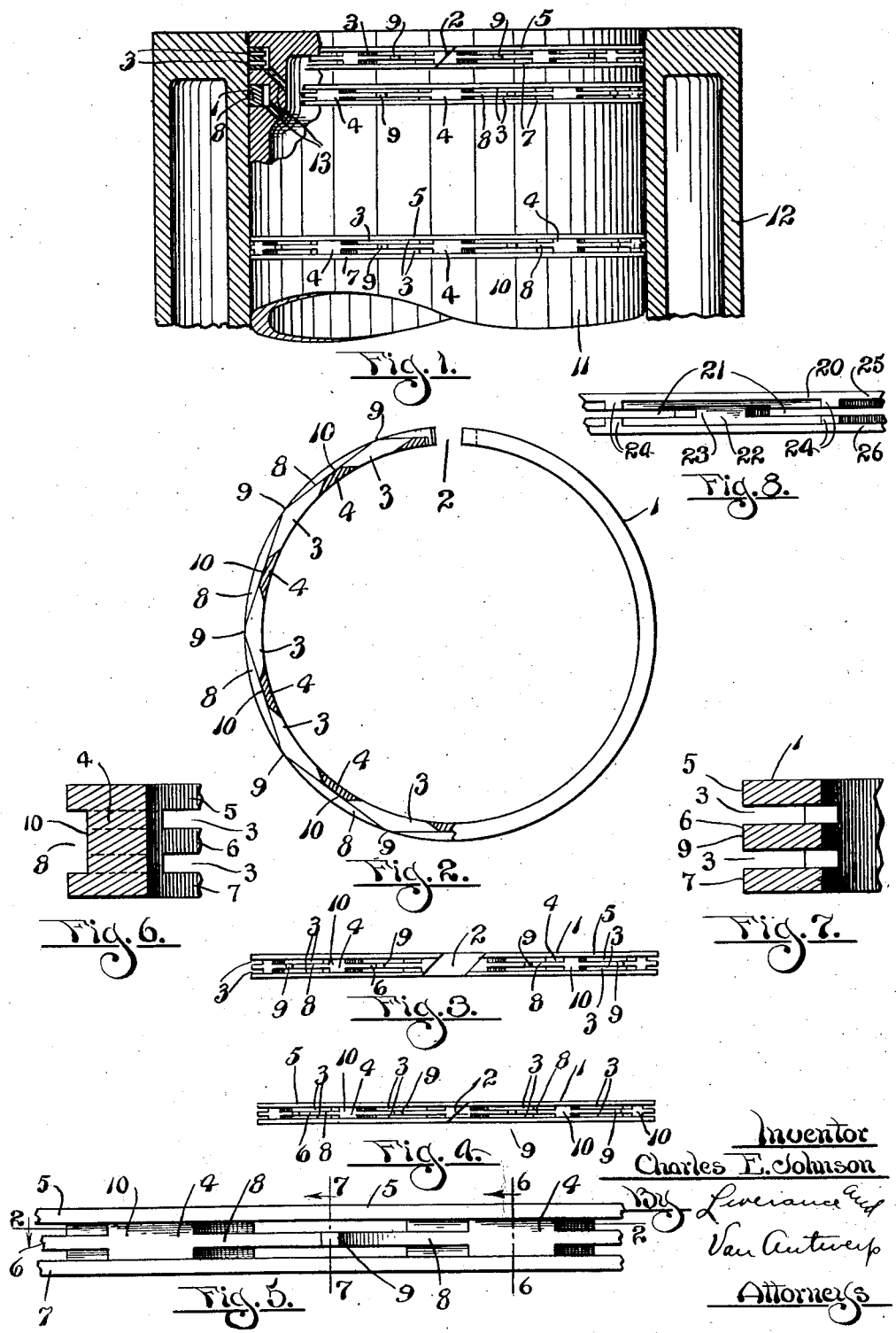

Patented Apr. 9, 1935

1,996,998

UNITED STATES PATENT OFFICE 1,996,998

PISTON RING

Charles E. Johnson, Muskegon, Mich., assignor, by mesne assignments, to The Perfect Circle Company, Hagerstown, Ind., a corporation of Indiana Application November 10, 1930, Serial No. 494,569

4 Claims. (Cl. 309—45)

This invention relates to piston rings. It is common to provide oil passage openings or slots from the outer curved to the inner curved side of piston rings, whereby excess oil may be taken from the walls of a cylinder, passed through said oil passages to the piston ring groove, from which drainage openings lead to the interior of the piston, this for the purpose of conserving and saving oil which otherwise is carried to the combustion chamber of an internal combustion engine and burned, oil being lost and undesired production of carbon taking place.

The present invention is directed to a particularly novel and practical construction of piston ring, easily manufactured at low cost, and which is substantially uniformly flexible and resilient at all points. With the construction of piston ring which I have invented oil may be scraped from the walls of a cylinder over the entire surface thereof and directed through oil carrying slots in the ring to the drainage openings leading to the interior of the piston.

An understanding of the invention for the attainment of the ends stated may be had from the following description, taken in connection with the accompanying drawing, in which, Fig. 1 is a fragmentary vertical section showing a piston within a cylinder equipped with piston rings of my invention.

Fig. 2 is a partial plan and partial section of a piston ring constructed in accordance with my invention, the plane of section being substantially on the plane of line 2—2 of Fig. 5.

Fig. 3 is an edge view of the piston ring showing the parting thereof.

Fig. 4 is a similar edge view showing the parting closed, it being shown open in Fig. 3.

Fig. 5 is a fragmentary enlarged edge view of the ring constructed in accordance with my invention.

Figs. 6 and 7 are transverse sections on the planes of lines 6—6 and 7—7, respectively, of Fig. 5, looking in the direction indicated by the arrows.

Fig. 8 is a face or edge view of a modified form of ring, this ring having a single row of slots.

Like reference characters refer to like parts in the different figures of the drawing.

The piston ring 1 in the first instance, before it is machined to provide the oil carrying slots, is a common and well known single piece ring made from an individual casting, uniform in cross section and having a parting 2 at one side which when the ring is free springs open, the parting being closed and its ends brought closely together when the ring is placed around a piston in a ring groove therein, within a cylinder.

With my invention at a plurality of planes between the upper and lower flat sides of the ring a series of narrow slots 3 are cut through the ring from its outer curved to its inner curved side. The slots are preferably cut with a circular metal cutting saw whereby each slot at the outer side of the ring is considerably longer than it is at the inner side. The series of slots in the two spaced apart planes in which they are cut are located with reference to each other so that one slot of a series is directly below the like slot of the upper series. The adjacent ends of the slots are separated by posts 4 which when the slots are first formed are of the same thickness radially as the ring. The slots form in effect the circumferential ring portions 5, 6, and 7 as best indicated in Fig. 7. The intermediate portion 6 of the ring between the upper and lower sections 5 and 7, in my invention, is machined and cut away at its outer portion to provide a series of cut away portions or wide pockets 8 cutting into and ending substantially midway between said posts, there being no continuous groove formed by cutting away the outer part of the intermediate portion 6 of the ring but there being left intervening narrow sections 9 between the adjacent ends of consecutive cut away portions 8. Said intervening portions 9 are located substantially midway between the posts 4, as indicated at 10 (Fig. 2). In effect the cut-away portions form a wide channel interrupted at points by the narrow sections 9.

A piston ring of this character may be fitted in the ring grooves of a piston such as 11 in Fig. 1, mounted for reciprocation in a cylinder 12. Drainage openings 13 from the bottoms of the ring grooves to the interior of the piston are made for draining oil from the ring grooves. On reciprocation of the piston the upper and lower slots 3 on respective movements of the piston collect the oil as it is scraped from the walls of the cylinder by the upper and lower sections 5 and 7, and the oil is carried through both series of slots to the bottom of the piston ring grooves due to the connection between the slots provided by the grooves 8 which make a continuously operating joining of the upper and lower slots at all times. It is understood, of course, that but one of my rings may be used on a piston if desired.

It will be noted that if the cut away portions 8 did not extend through the outer portions of the posts 4 there would be certain narrow sections of the inner walls of the cylinder which would not be operated upon by the piston rings to scrape the oil therefrom. But with the cut away portions 8 extending through the outer parts of the posts 4, as indicated at 10, there is no part of the walls of the cylinder not acted upon by oil scraping and oil collecting grooves at all times, and all oil collected from the cylinder walls in either direction of travel of the piston is carried through both series of slots 3 to the ring grooves and thence through the oil drainage openings.

Fig. 8 discloses a modification of my invention which has only a single row of slots but otherwise is very similar to the double slotted ring.

The ring proper 20, is of the split variety, having slots 21 cut therethrough. Cut away parts of the ring, as indicated at 22, give it a polygonal cross sectional shape, similar to that shown in Fig. 2, and posts 23, similar to posts 4, are formed. The posts are adjacent the deepest portions of the recesses 22. Narrow sections 24 are flush with the outer periphery of the ring. Upper and lower sections or ribs 25 and 26 of the ring are circular in cross section and serve to scrape and contact snugly against the walls of the cylinder.

It is apparent that these constructions provide rings of substantially uniform flexibility and resiliency which would not be true if the outer portions of the posts and parts of the intermediate sections were not cut away. By this invention metal is removed from the middle portion of the ring opposite the posts and removing the outer parts of said posts where the ring would otherwise be stiffest and leaving metal on the outer portions of the intermediate sections between the posts whereby the cross sectional area of the ring at all points is substantially uniform and therefore the strength and tension of the ring is substantially uniform.

This novel construction of ring is one of a very practical nature and with which the rings are lightened in weight and the ring made of more uniform resiliency and the oil may be scraped from the entire surface of the inner wall of the cylinder. The invention is defined in the appended claims and is to be considered comprehensive of all forms of structure coming within their scope.

I claim:

1. A resilient piston ring formed in its outer peripheral face with elongated oil pockets spaced apart from each other endwise and separated by dam portions integral with the ring, slots extending radially through the dam portion of the ring in a plane substantially parallel with the planes of the flat faces of the ring said slots establishing communication between the inner face and the outer face of the ring and connecting adjacent pockets.

2. A resilient piston ring formed in its outer peripheral face with elongated oil pockets spaced apart endwise from each other and separated by dam portions integral with the ring, and apertures extending entirely through the ring at said dam portions, and establishing communication between the inner face and the outer face of the ring.

3. In a resilient piston ring having a single series of aligned elongated slots opening into the inner face of the ring, posts between the adjacent ends of said slots, the posts being considerably narrower radially than the thickness of the ring radially, and elongated pockets formed in the outer face of the ring and extending over the posts and over substantial portions of the slots with which the pockets communicate, and dams merging into the side wall portion of said pocket on both sides of said slots, the dams having circumferentially-narrow cylinder-contacting surfaces and being between the ends of the pockets and intermediate the posts circumferentially of the ring to strengthen the ring at points intermediate the posts.

4. In a resilient piston ring having a single series of aligned elongated slots opening into the inner face of the ring, posts between the adjacent ends of said slots, the posts being considerably narrower radially than the thickness of the ring radially, and elongated pockets formed in the outer face of the ring and extending over the posts and over substantial portions of the slots with which the pockets communicate, and dams merging into the side wall portion of said pocket on both sides of said slots, the dams having circumferentially - narrow cylinder - contacting surfaces and being between the ends of the pockets and intermediate the posts circumferentially of the ring, the pockets being deepest at the posts and gradually decreasing to the dams to provide a ring of substantially uniform cross section.

CHARLES E. JOHNSON.